US012598434B1

(12) United States Patent
Lovchinsky et al.

(10) Patent No.: US 12,598,434 B1
(45) Date of Patent: Apr. 7, 2026

(54) CONSTANT IMPROVEMENT OF HEARING AIDS BY RETRAINING WITH SELECTED DATA COLLECTED IN USE

(71) Applicant: Fortell Research Inc., New York, NY (US)

(72) Inventors: Igor Lovchinsky, New York, NY (US); Jonathan Macoskey, Pittsburgh, PA (US); Philip Meyers, IV, Brooklyn, NY (US); Israel Malkin, Manhattan Beach, CA (US); Nicholas Morris, Brooklyn, NY (US)

(73) Assignee: Fortell Research Inc., New York, NY (US)

( * ) Notice: Subject to any disclaimer, the term of this patent is extended or adjusted under 35 U.S.C. 154(b) by 225 days.

(21) Appl. No.: 18/112,981

(22) Filed: Feb. 22, 2023

Related U.S. Application Data

(60) Provisional application No. 63/313,244, filed on Feb. 23, 2022.

(51) Int. Cl.
*H04R 25/00* (2006.01)
*G06N 3/09* (2023.01)

(52) U.S. Cl.
CPC ............. *H04R 25/507* (2013.01); *G06N 3/09* (2023.01); *H04R 25/604* (2013.01); *H04R 25/609* (2019.05); *H04R 2225/39* (2013.01); *H04R 2225/43* (2013.01); *H04R 2225/55* (2013.01)

(58) Field of Classification Search
CPC .. H04R 25/507; H04R 25/609; H04R 25/604; H04R 2225/39; H04R 2225/43; H04R 2225/55; G06N 3/09
See application file for complete search history.

(56) References Cited

U.S. PATENT DOCUMENTS

| | | | |
|---|---|---|---|
| 9,881,631 B2 | 1/2018 | Erdogan et al. | |
| 10,721,571 B2 | 7/2020 | Crow et al. | |
| 10,812,915 B2 | 10/2020 | Santos et al. | |
| 10,957,301 B2 | 3/2021 | Hoby et al. | |
| 11,330,378 B1 | 5/2022 | Jelcicová et al. | |
| 11,375,325 B2 | 6/2022 | Froehlich et al. | |
| 2021/0289299 A1 | 9/2021 | Durrieu | |
| 2021/0327402 A1* | 10/2021 | Xie | .................. G10K 11/17885 |
| 2022/0095061 A1 | 3/2022 | Diehl et al. | |

(Continued)

FOREIGN PATENT DOCUMENTS

| | | |
|---|---|---|
| EP | 0 357 212 A2 | 3/1990 |
| WO | WO 2022/079848 A1 | 4/2022 |

(Continued)

OTHER PUBLICATIONS

Giri et al., Personalized Percepnet: Real-time, Low-complexity Target Voice Separation and Enhancement. Amazon Web Service, Jun. 8, 2021, arXiv preprint arXiv:2106.04129. 5 pages.

*Primary Examiner* — Mark Fischer
(74) *Attorney, Agent, or Firm* — Wolf, Greenfield & Sacks, P.C.

(57) ABSTRACT

Ear-worn devices such as hearing aids are described herein. The ear-worn devices include a machine learning model for enhancing received audio signals to be played out to the wearer. The machine learning model is re-trainable based on the received audio signals. The ear-worn device is configured to selectively store received audio signals to be used in re-training the machine learning model.

28 Claims, 6 Drawing Sheets

(56)                    References Cited

U.S. PATENT DOCUMENTS

| | | |
|---|---|---|
| 2022/0159403 A1 | 5/2022 | Sporer et al. |
| 2022/0223161 A1 | 7/2022 | Fuchs et al. |
| 2022/0230048 A1 | 7/2022 | Li et al. |
| 2022/0232321 A1 | 7/2022 | Wexler et al. |
| 2022/0232331 A1 | 7/2022 | Jelcicová et al. |
| 2022/0256294 A1 | 8/2022 | Diehl et al. |

FOREIGN PATENT DOCUMENTS

| | | |
|---|---|---|
| WO | WO 2022/107393 A1 | 5/2022 |
| WO | WO 2022/191879 A1 | 9/2022 |

* cited by examiner

200

210

212

210/214

210/216

110

CONSTANT IMPROVEMENT OF HEARING AIDS BY RETRAINING WITH SELECTED DATA COLLECTED IN USE

CROSS REFERENCE TO RELATED APPLICATIONS

This Application claims the benefit under 35 USC § 119(e) of provisional U.S. Application Ser. No. 63/313,244, filed Feb. 23, 2022, and entitled "METHOD, APPARATUS AND SYSTEM FOR CONSTANT IMPROVEMENT IN A HEARING AID OR HEARING AUGMENTATION DEVICE," which is hereby incorporated by reference herein in its entirety.

BACKGROUND

Field

The present application relates to ear-worn speech enhancement devices.

Related Art

Hearing aids are used to help those who have trouble hearing to hear better. Typically, hearing aids amplify received sound and play the amplified sound back to the wearer.

BRIEF SUMMARY

A hearing aid having a de-noising model trainable with data collected by the hearing aid during operation includes a microphone configured to receive an acoustic signal during operation. A random access memory temporarily stores the acoustic signal. Processing circuitry determines a metric of the acoustic signal and de-noises the acoustic signal using a neural network. The hearing aid also includes persistent memory. The controller selectively sends the acoustic signal to the persistent memory depending on the metric.

An ear-worn device includes a microphone to receive an acoustic signal, and processing circuitry to make a determination of whether to store or discard data obtained from the acoustic signal based on a metric obtained using the data. The ear-worn device also includes a storage to store the data based on the determination being to store the data. The data is used to train a machine learning model implemented by the processing circuitry.

A method of manufacturing a hearing aid having a de-noising model trainable with data collected by the hearing aid during operation includes arranging a microphone to receive an acoustic signal during operation and arranging random access memory to temporarily store the acoustic signal. The method also includes configuring processing circuitry to determine a metric of the acoustic signal and to de-noise the acoustic signal using a neural network, and coupling persistent memory to the processing circuitry. The processing circuitry selectively sends the acoustic signal to the persistent memory depending on the metric.

A method of collecting training data, with an ear-worn device having a microphone, includes receiving an acoustic signal with the microphone of the ear-worn device. After receiving the acoustic signal, the method includes writing a digital representation of the acoustic signal to a buffer and calculating a metric of the acoustic signal based on the digital representation of the acoustic signal. The method further includes comparing the metric to a threshold value, writing the digital representation of the acoustic signal to persistent storage in dependence on a result of comparing the metric to the threshold value, and subsequently transferring the digital representation of the acoustic signal from the ear-worn device to an external device.

A method of re-training a hearing aid having a machine learning model includes using the hearing aid to enhance a received audio signal for playback to a wearer, and re-training the machine learning model using the received audio signal.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
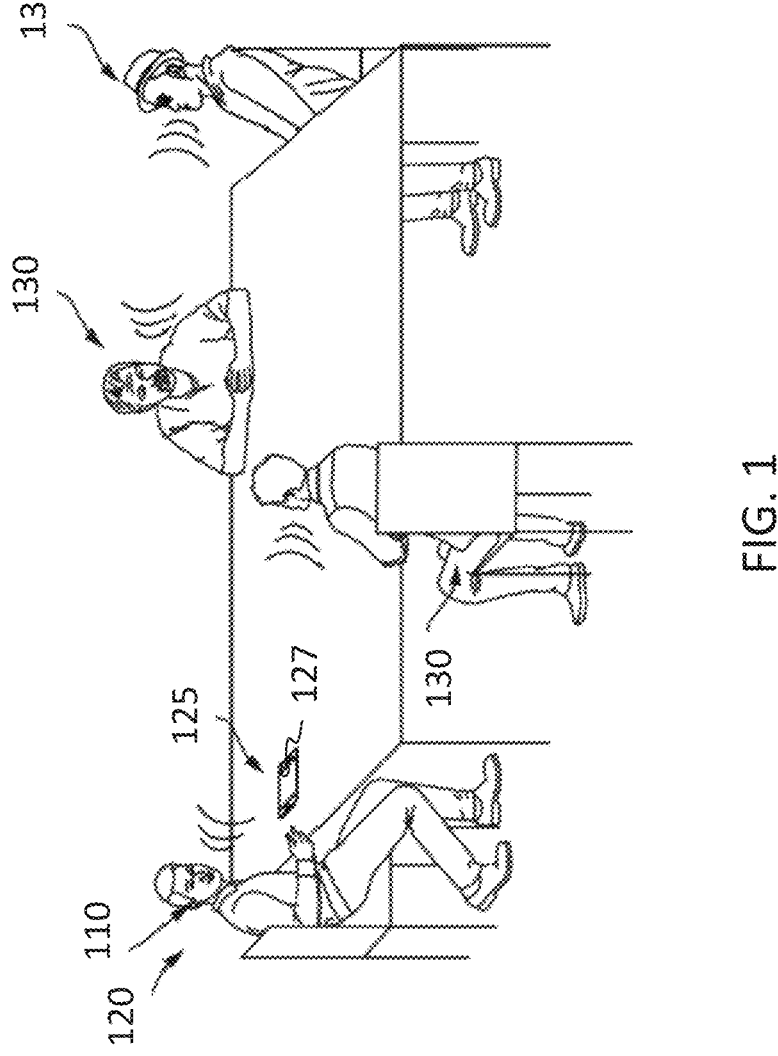
FIG. 1 illustrates an example multi-speaker environment in which an ear-worn device may collect training data, according to a non-limiting embodiment of the present application.

Aspects of the present technology provide hearing systems and methods for continually improving audio enhancement provided by an ear-worn device implementing a machine learning model. The enhancement may include, for example, de-noising a received audio signal. De-noising may include improving a signal-to-noise ratio (SNR) of the received audio signal, for example, by lowering noise levels while amplifying speech. In some embodiments, enhancement of the received audio signal may include identifying the presence of a target or non-target speaker's speech in the received audio signal and processing the received audio signal for output to a listener based on detection of the target or non-target speaker's speech. The ear-worn device may enhance the received audio signal in the manners mentioned above using a machine learning model that performs the de-noising and/or speaker recognition. The machine learning model may operate sufficiently quickly that the enhanced audio signal can be played out to the wearer with low latency.

Prior to deployment in the ear-worn device, the machine learning model may be trained on a large, computationally powerful system. The performance of the machine learning model is influenced by the quality of the training data used to train the algorithm implemented by the machine learning model. Generally, a training process involves iteratively implementing the algorithm on training data while tuning parameters of the algorithm to minimize a loss function. For example, to train an algorithm to remove background noise from speech, training data may include clean speech and speech mixed with noise. During the training process, the loss function may be minimized by removal of the noise. The more accurately the training data represents the speech and noise that the ear-worn device implementing the machine learning model will encounter in the real world, the better the machine learning model will perform when deployed in the ear-worn device.

Performance of the machine learning model may be improved after initial deployment by continually training the machine learning model, but the size, storage, and power constraints of the ear-worn device may present a challenge in this regard. Ear-worn devices, such as hearing aids, typically are limited in size, data storage capacity, processing capacity, and power. This contrasts with some platforms for machine learning applications (e.g., automated factory, vehicle, non-wearable devices, and even some other wearable devices), which may have significantly greater capacity in these respects. The limitations of hearing aids in terms of size, storage capacity, processing capacity, and power may prevent continuous training that involves collecting data and updating the machine learning model in parallel with its use. Yet, using data collected by the ear-worn device from its environment during normal operation provides a benefit to training the machine learning model that is not achievable simply by training the model separately on pre-compiled training data.

In view of the benefits of continually training the machine learning model with relevant training data and in consideration of the limitations of the ear-worn device implementing the machine learning model, the inventors have recognized benefits from collecting training data with the ear-worn device and performing the training on a separate device. As detailed herein, during use of the ear-worn device data is collected and selectively stored in the ear-worn device and provided to an external device for subsequent training of the machine learning model. The external device may also use additional training data to further personalize the machine learning model. For example, the external device may use data to enhance the machine learning model output of audio of interest, such as a house alarm. The external device may also combine the collected training data with other audio data synthetically to create new acoustic signals that can be used as additional training data. Continued training with additional training data improves the accuracy and minimizes error of the machine learning model. Additionally, training the model with data obtained from the wearer's environment may allow for personalizing the machine learning model and thus improving the results for the type of audio generally experienced by the ear-worn device wearer. Overall, the wearer's experience may be improved by updating the machine learning model used by the ear-worn device.

A hearing system may include an ear-worn device, such as a hearing aid, and a separate electronic device, such as a mobile phone or tablet or a cloud-based server, in communication with the ear-worn device. As described above and elsewhere herein, the separate electronic device may be used to further train the machine learning model implemented in the ear-worn device. The trained machine learning model may then be used to update the model in the ear-worn device. Specifically, audio received by the ear-worn device during use of the ear-worn device is selectively stored for use in batch training, which involves the external device training the same machine learning model that is implemented by the ear-worn device with the received data. The updated machine learning model may then be copied from the external device to the ear-worn device for subsequent use. Being selective about the audio that is captured during operation of the ear-worn device and stored in the ear-worn device may not only facilitate conforming to the limited storage capacity of the ear-worn device but may also improve the quality of the training. A metric may be obtained from the audio received by the ear-worn device and the metric may be used to determine whether the received audio should be stored for use in updating the machine learning model. The metric may be a signal-to-noise ratio (SNR) of the received audio, for example. The metric may additionally or alternately be applied to a result of implementing the machine learning model on the received audio.

The aspects and embodiments described above, as well as additional aspects and embodiments, are described further below. These aspects and/or embodiments may be used individually, all together, or in any combination of two or more, as the disclosure is not limited in this respect.

As described above, aspects of the technology described herein provide updating a machine learning model implemented in an ear-worn device to enhance the audio output provided to a wearer. The updating may involve re-training the machine learning model using data collected from the user's environment during normal use of the ear-worn device and/or using personalization data. The updating may involve another device external to the ear-worn device. U.S. application Ser. No. 18/097,154, filed on Jan. 13, 2023 and entitled "SYSTEM AND METHOD FOR ENHANCING SPEECH OF TARGET SPEAKER FROM AUDIO SIGNAL IN AN EAR-WORN DEVICE USING VOICE SIGNATURES," describes ear-worn devices, including hearing aids, which include a machine learning model to implement speech enhancement, and which may be an example of an ear-worn device to which aspects of the present application may apply. U.S. application Ser. No. 18/097,154 is incorporated herein by reference in its entirety.

FIG. 1 illustrates an environment 100 in which an ear-worn device 110 may be deployed and in which data may be collected for additional training of the machine learning model of the ear-worn device 110. The illustrated setting of the environment 100 is one in which multiple individuals may speak simultaneously. The multi-speaker environment 100 includes ear-worn device wearer 120 and other individuals 130 who may be speakers or non-speakers.

The ear-worn device wearer 120 has an ear-worn device 110 in the illustration of FIG. 1. According to examples, the ear-worn device 110 implements a machine learning model, such as a neural network, to de-noise or otherwise enhance audio that the ear-worn device wearer 120 hears in real time. As previously noted, de-noising may involve lowering noise levels while amplifying speech. The machine learning model may further process the de-noised audio signal by determining an embedding of the audio signal, which may be compared to a reference embedding representing a voice signature. The audio signal may then be processed differently depending on whether the embedding determined from the received audio signal matches the reference embedding. For example, the wearer's own voice may be attenuated, or the speech of a conversation partner may be enhanced.

The ear-worn device wearer 120 may have other devices 125, such as a smart phone, as in the illustrated example, or a camera, environmental sensor, touch sensor, or other sensor that includes a microphone 127. The exemplary environment 100 of FIG. 1 is not intended to limit additional or alternate environments in which an ear-worn device 110 may collect data for additional training of its machine learning model. Other exemplary environments 100 include a home, a park, an office, a sporting event, an airport, or another settings in which different types of audio, such as voices, cars, alarms, machines, and the like, may be encountered.

Figure 2:
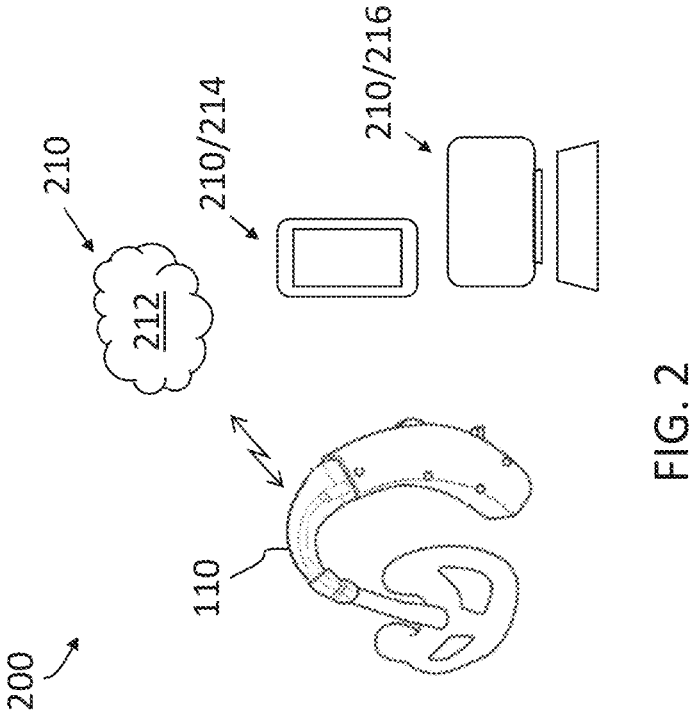
FIG. 2 illustrates an example ear-worn device training system, according to a non-limiting embodiment of the present application.

FIG. 2 illustrates an example ear-worn device training system 200, according to a non-limiting embodiment of the present application. As shown, the ear-worn training system 200 includes the ear-worn device 110, which may transfer training data 365 (FIG. 3) to one or more electronic devices 210 that perform batch training of the machine learning model implemented by the ear-worn device 110. Examples of an electronic device 210 that may obtain data from the ear-worn device 110 and perform the training with the data include a cloud-based server 212, a cellular device 214, such as a smart phone or tablet, and a computer 216. The numbers, types, and locations of the electronic devices 210 that may be used are not intended to be limited by the examples. For example, an ear-worn device 110 may be taken to a retail location that sells ear-worn devices for download of the training data 365 that was selectively stored in the ear-worn device. The machine learning model implemented by the ear-worn device 110 may be trained with the training data 365 using an electronic device 210 at the retail location and the ear-worn device 110 may then be updated with the trained machine learning model.

Figure 3A:
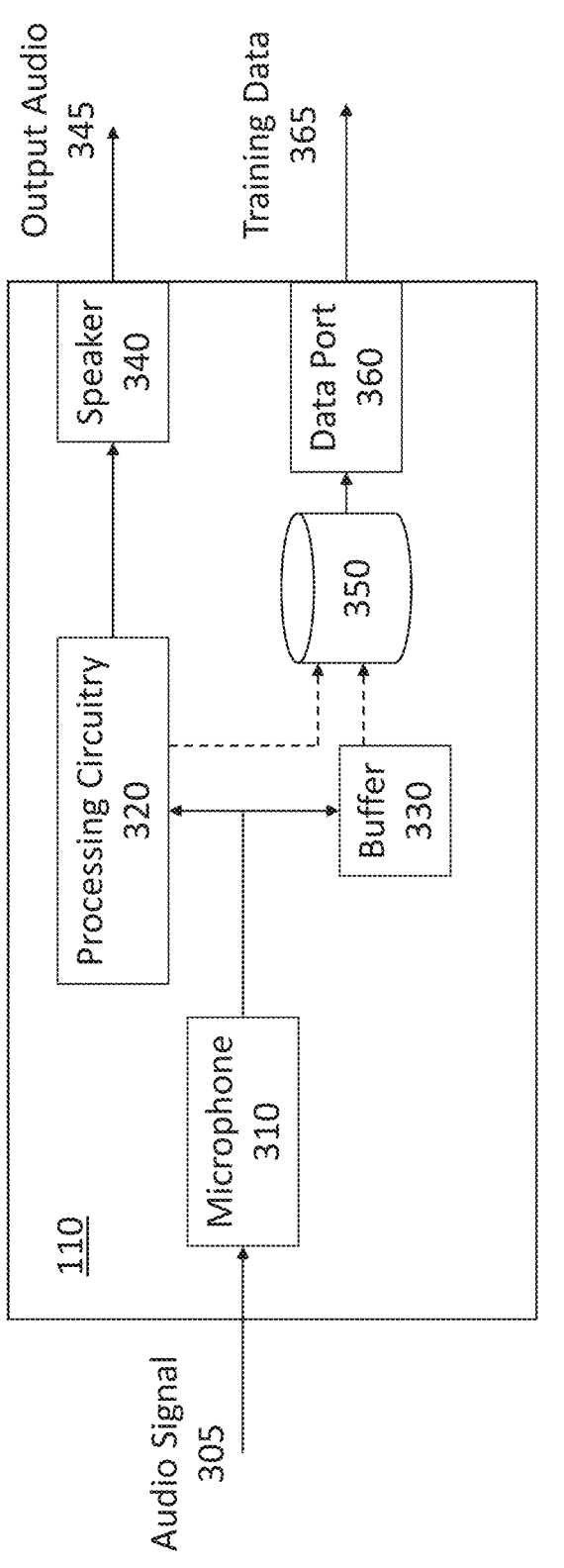
FIG. 3A is a block diagram of an ear-worn device, according to a non-limiting embodiment of the present application.

FIG. 3A is a block diagram of an ear-worn device 110 according to a non-limiting embodiment of the present application. In some non-limiting examples, ear-worn device 110 may include microphone 310 and speaker 340. Microphone 310 may be configured to receive audio signal 305 from sound (e.g., speech). For example, audio signal 305 may include temporally overlapping speech components from multiple speakers. Ear-worn device 310 may include processing circuitry 320 to process audio signal 305 detected by microphone 310. Processing circuitry 320 may include processing circuitry and memory required to characterize audio signal 305 and to implement a machine learning model to enhance audio signal 305. For example, processing circuitry 320 may isolate a component of the audio signal representing the target speaker's speech from among the temporally overlapping speech components from multiple speakers. In some embodiments, ear-worn device 110 may be configured to process audio signal 305 using a voice signature of the target speaker. In some examples, the voice signature of a speaker may be a multi-dimensional feature vector. The voice signature may contain data in frequency-domain, time-domain, or any suitable data that may be representative of speech by other individuals 130. Speaker 340 may include an audio output device configured to playback output audio 345 from the processing circuitry 320, which implements the machine learning model in ear-worn device 110.

In some non-limiting examples, ear-worn device 110 may include buffer 330, storage device 350, and, optionally, a data port 360. In some embodiments, audio signal 305 received by microphone 310 may be provided to buffer 330 in addition to processing circuitry 320. In an example, buffer 330 may be random access memory (RAM). In addition to processing audio signal 305, processing circuitry 320 may determine one or more metrics from audio signal 305. For example, processing circuitry 320 may determine signal-to-noise ratio (SNR) of audio signal 305. If the metric exceeds a predefined threshold, processing circuitry 320 may then move audio signal 305 from buffer 330 to storage device 350. In an example, storage device 350 may be persistent memory, such as dynamic RAM (DRAM). In another example, processing circuitry 320 may alternately or additionally determine another metric associated with the result of processing audio signal 305 with the machine learning model, which is output audio 345. If the other metric exceeds a predetermined threshold, processing circuitry 320 may store output audio 345 in storage device 350, in addition to providing output audio 345 to speaker 340. The other metric may be a prediction of error associated with output audio 345 or a confidence level for the prediction, for example. The metric may be an error and/or confidence level of the output of the machine learning model, which in at least some embodiments may be a neural network.

In some non-limiting examples, ear-worn device 110 may include an optional data port 360 to provide access to data stored in storage device 350 as training data 365. Training data 365 may be provided to an external device via streaming, for example. In some embodiments, the streaming may be performed only when the battery level of the ear-worn device 110 exceeds a threshold value. Alternately or additionally, the training data 365 may be provided when the ear-worn device 110 is being charged and not in use. A Bluetooth® connection or other known connectivity scheme may be utilized. Training data 365 may be accessed by an electronic device 210 via data port 360 and used to perform further training on a machine learning model that uses the same algorithm as the machine learning model implemented by processing circuitry 320 of the ear-worn device 110. Electronic device 210 may perform batch training of the machine learning model to develop an updated machine learning model that may then be used to replace the machine learning model of the ear-worn device 110.

Figure 3B:
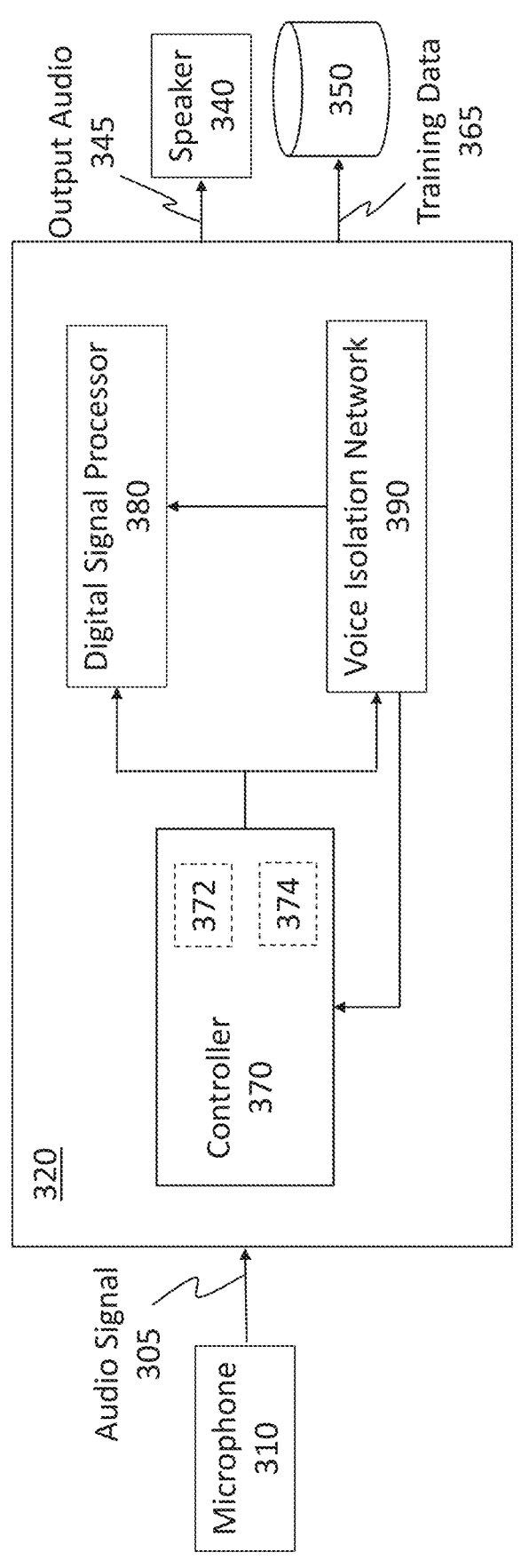
FIG. 3B is a block diagram detailing aspects of the processing circuitry shown in FIG. 3A.

FIG. 3B is a block diagram detailing aspects of the processing circuitry 320 shown in FIG. 3A. An exemplary configuration of the processing circuitry 320 is illustrated which includes controller 370, digital signal processor (DSP) 380, and voice isolation network 390. Controller 370 is shown to include storage circuitry 372 and a voice activity detector (VAD) 374. Controller 370, like DSP 380 and voice isolation network 390, may additionally include one or more processors, memory circuitries, and other electronic and software components to perform functions described for processing circuitry 320 of ear-worn device 110. Controller 370 may implement decision logic to determine whether an input audio signal 305 should be provided for processing by DSP 380 and/or voice isolation network 390. Controller 370 may additionally prepare the audio signal 305 for processing by DSP 380 and/or voice isolation network 390 by performing digital signal processing operations. Controller 370, DSP 380, and voice isolation network 390 may operate alone or in combination to implement the machine learning model that enhances audio signal 305 to provide output audio 345 (e.g., by performing de-noising). Controller 370 may implement one or more aspects of facilitating the additional training of the machine learning model. For example, controller 370 may determine the metric and determine what data to store as training data 365 based on a comparison of the metric with a threshold.

Figure 4:
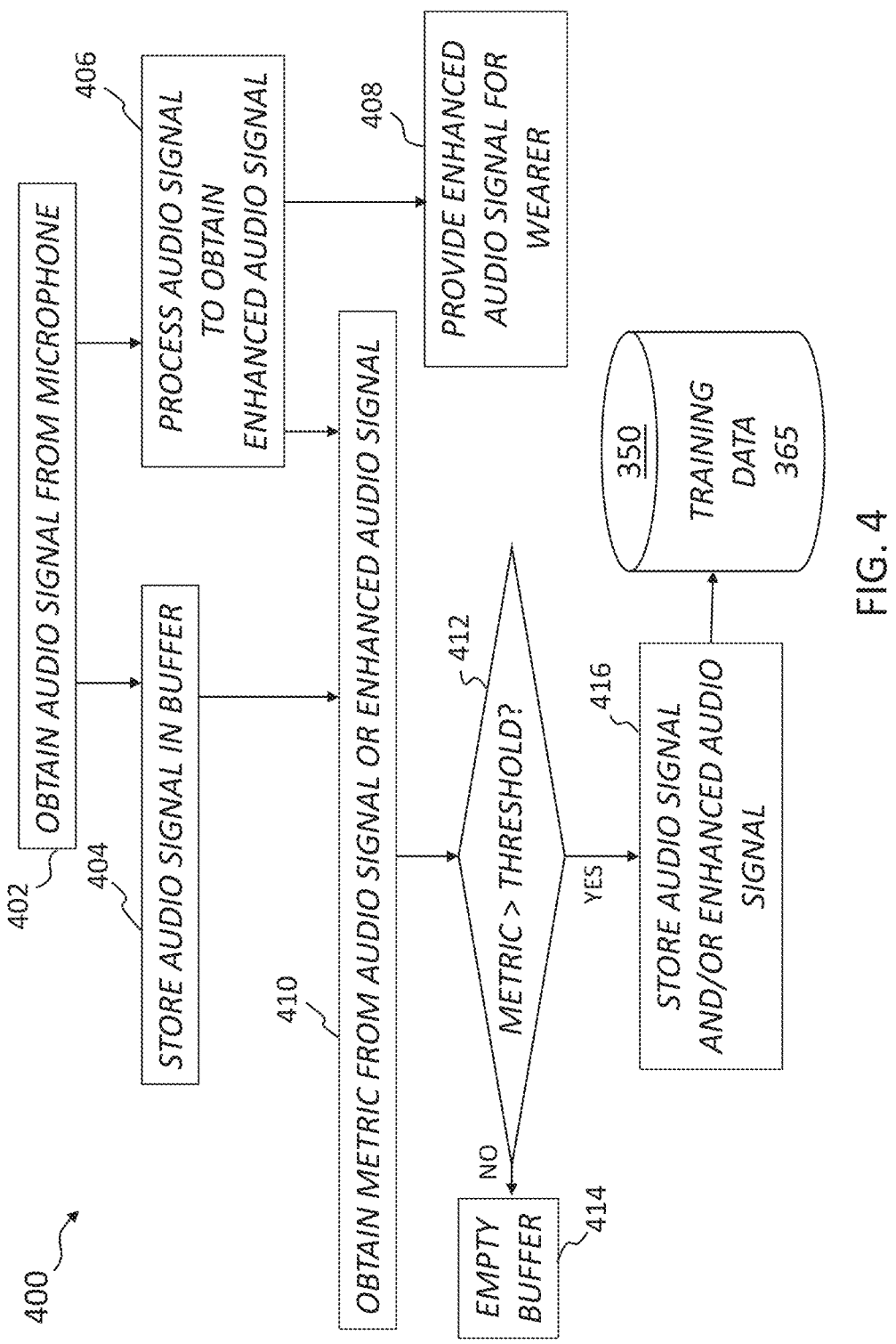
FIG. 4 is a flowchart of an example method of aspects of operation of an ear-worn device pertaining to storing training data, according to a non-limiting embodiment of the present application.

FIG. 4 is a flowchart of an example method 400 of performing aspects of operation of an ear-worn device 110 pertaining to storing training data 365, according to a non-limiting embodiment of the present application. Method 400 may be implemented by processing circuitry 320 of ear-worn device 110. Act 402 involves obtaining audio signal 305 from microphone 310, which receives audio signal 305. Storing audio signal 305 in buffer 330, at act 404, and processing audio signal 305 (with a machine learning model) to obtain an enhanced audio signal (audio output 345), at act 406, may both be done by processing circuitry 320. Based on processing audio signal 305, at act 406, providing the enhanced audio signal for a wearer 120 of ear-worn device 110, at act 408, may involve sending audio output 345 to speaker 340.

Act 410 may use input of audio signal 305, stored in buffer 330, and the enhanced audio signal (output audio 345) resulting from processing of audio signal 305. The inputs to act 410 are referred to generally as data. At act 410, obtaining a metric from audio signal 305 may include obtaining SNR. Alternately, obtaining a metric, at act 410, may include obtaining a prediction of error associated with output audio 345 or a confidence level for the prediction. the VAD 374 to identify the presence or absence of speech. In the exemplary case of the machine learning model implementing speech isolation, speech quality metrics, such as perpetual evaluation of speech quality (PESQ) or short-term objective intelligibility (STOI), may be the metric obtained at act 410. At act 412, a check is performed for the metric obtained at act 410. Specifically, the check determines whether the metric exceeds a predefined associated threshold value. If the check at act 412 indicates that the metric does not exceed the threshold, then act 414 is performed to empty buffer 330 of audio signal 305. If the check at act 412 indicates that the metric does exceed the threshold, then audio signal 305 and, additionally or alternately, the enhanced audio signal, output audio 345 resulting from implementation of the machine learning model, is stored by moving to storage device 350 as training data 365.

Figure 5:
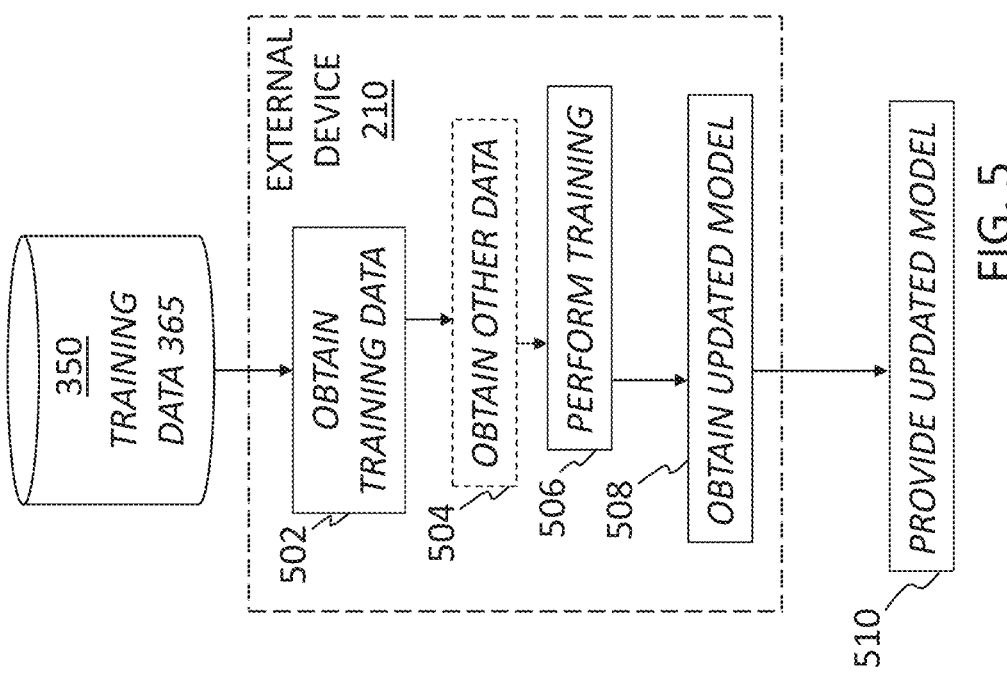
FIG. 5 is a flowchart of an example method pertaining to training a machine learning model implemented by an ear-worn device, according to a non-limiting embodiment of the present application.
Figure 5:

FIG. 5 is a flowchart of an example method 500 pertaining to training a machine learning model implemented by an ear-worn device 110, according to a non-limiting embodiment of the present application. The method 500 may be performed by any external device 210 with access to the training data 365 stored in storage device 350 of ear-worn device 110. Act 502 involves obtaining training data 365 from the ear-worn device 110. This act may involve optional data port 360 of ear-worn device 110. As previously noted, this act may instead involve transmitting the training data 365, based on battery capacity or during charging for example.

Act 504 is optional and involves obtaining other data that may also be used for training. The other data may be from one or more microphones 127 in one or more other devices 125 used by the ear-worn device wearer 120. The other data may include prompted speech from certain people, for example, when the machine learning model is being trained to particularly improve performance when the ear-worn device wearer 120 is conversing with those certain people. For example, voice samples may be recorded using a smartphone with the speaker being at different distances to obtain samples of different quality. Voice signatures may be used by the machine learning model implementing a voice isolation algorithm to develop and maintain a speaker registry. The other data may be obtained from any source. For example, training data 365 collected by one ear-worn device 110 may be used as other data by one or more other ear-worn devices 110 as part of an exchange scheme that allows ear-worn device wearers 120 to opt in to exchange training data 365, anonymously or with known ear-worn device wearers 120. The other data may also be synthetic.

The training data 365 or other data may include audio obtained specifically for the purpose of training the machine learning model. Such audio may be obtained based on consent of a person providing audio for establishment of their voice signature, for example. As another example, heuristic measures (e.g., SNR) may be used to determine types of audio for which the machine learning algorithm requires more training and the other data obtained at act 504, like the training data 365 obtained based on metrics, may be based on the type of audio needed for further training. As yet another example, training data 365 or other data may be collected by an ear-worn device wearer 120 for specific training. A house alarm audio may be collected to ensure that its tone is amplified based on further training of the machine learning model, for example. Alternately, certain sound samples (e.g., dogs barking) may be collected to filter them out for the ear-worn device wearer 120. These certain sounds may trigger a notification (e.g., haptic or text notification via a smartphone) instead. Ultimately, further training of a given ear-worn device 110 may be personal to the ear-worn device wearer 120 (e.g., based only on training data 365 collected by the ear-worn device 110 and, optionally, other data collected for the ear-worn device wearer 120) and/or may be pooled among multiple ear-worn devices 110 so that the ML models operating on the ear-worn devices of an entire group of people are updated and improved (e.g., based on training data 365 collected by the multiple ear-worn devices 110 and, optionally, other data that is more general). Different training sessions of the same ear-worn device 110 may alternate between personal and pooled training.

Performing training, at act 506, refers to one or more processors of the external device 210 training a machine learning model that performs the same functionality as the machine learning model implemented by processing circuitry 320 of ear-worn device 110. The training may be supervised, labelled training, for example, and may modify weights applied at different levels of a neural network. The training results in the external device 210 obtaining an updated model at act 508. At act 510, the updated model is provided to the ear-worn device 110. The updated model may replace the machine learning model of the ear-worn device 110. The updated model may be incorporated into the ear-worn device 110 while the ear-worn device 110 is being charged and not in use, for example.

Various aspects and embodiments of the technology have been described. According to some aspects of the present technology, a method is provided for re-training a hearing aid having a machine learning model. The method comprises using the hearing aid to enhance and play back received audio signals. Also, the received audio signals are used to re-train the machine learning model. Therefore, the received audio is used for the dual purposes of playback and model re-training. Aspects of the present technology also provide a hearing aid configured to operate in such a manner.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

What is claimed is:

1. A hearing aid having a de-noising model trainable with data collected by the hearing aid during operation, the hearing aid comprising:
   a microphone configured to receive an acoustic signal during operation;
   random access memory configured to temporarily store the acoustic signal;
   processing circuitry configured to determine a metric of the acoustic signal and to de-noise the acoustic signal using a neural network; and
   persistent memory, wherein the processing circuitry is additionally configured to selectively send the acoustic signal to the persistent memory depending on the metric.

2. The hearing aid of claim 1, wherein the metric is signal-to-noise ratio (SNR) of the acoustic signal.

3. The hearing aid of claim 1, further comprising a data port configured to provide the acoustic signal in the persistent memory to an external device.

4. The hearing aid of claim 3, wherein the processing circuitry is configured to obtain an updated neural network based on training performed by the external device using the acoustic signal.

5. The hearing aid of claim 3, wherein the external device is a cellular device, a cloud-based device, or a combination.

6. An ear-worn device, comprising:
   a microphone configured to receive an acoustic signal;
   processing circuitry configured to make a determination of whether to store or discard data obtained from the acoustic signal based on a metric obtained using the data; and
   a storage configured to store the data based on the determination being to store the data, wherein the data is used to train a machine learning model implemented by the processing circuitry.

7. The ear-worn device of claim 6, further comprising:
   a buffer configured to temporarily store the acoustic signal received by the microphone, wherein the data is the acoustic signal and the metric is a measure of audio quality of the acoustic signal.

8. The ear-worn device of claim 7, wherein the measure of audio quality is a signal-to-noise ratio (SNR) of the acoustic signal, and the processing circuitry is configured to make the determination to store the data in the storage based on the SNR of the acoustic signal exceeding a threshold SNR.

9. The ear-worn device of claim 6, wherein the processing circuitry is configured to implement the machine learning model on the acoustic signal received by the microphone and the data is an output audio signal of the machine learning model which is provided as output to a wearer of the ear-worn device.

10. The ear-worn device of claim 9, wherein the metric is based on the output audio signal and the processing circuitry is configured to make the determination to store the data in the storage based on the metric exceeding a threshold metric.

11. The ear-worn device of claim 9, wherein the metric is a measure of audio quality of the output audio signal of the machine learning model.

12. The ear-worn device of claim 9, wherein the metric is a prediction of error of the output audio signal relative to the acoustic signal.

13. The ear-worn device of claim 12, wherein the metric is a confidence level for the prediction.

14. The ear-worn device of claim 6, wherein the storage is configured to provide the data to an external device for training of the machine learning model.

15. The ear-worn device of claim 14, wherein the external device is a cellular device.

16. The ear-worn device of claim 14, wherein the external device is a cloud-based device.

17. The ear-worn device of claim 14, wherein the external device obtains other data in addition to the data to train the machine learning model, the other data being obtained by a device other than the ear-worn device.

18. The ear-worn device of claim 17, wherein the other data may be obtained with a smart phone of a wearer of the ear-worn device or a sensor used by the wearer.

19. A method of manufacturing a hearing aid having a de-noising model trainable with data collected by the hearing aid during operation, the method comprising:
   arranging a microphone to receive an acoustic signal during operation;
   arranging random access memory to temporarily store the acoustic signal;
   configuring processing circuitry to determine a metric of the acoustic signal and to de-noise the acoustic signal using a neural network;
   coupling persistent memory to the processing circuitry; and
   configuring the processing circuitry to selectively send the acoustic signal to the persistent memory depending on the metric.

20. A method of collecting training data, with an ear-worn device having a microphone, the method comprising:
   receiving an acoustic signal with the microphone of the ear-worn device;
   after receiving the acoustic signal, writing a digital representation of the acoustic signal to a buffer;
   calculating a metric of the acoustic signal based on the digital representation of the acoustic signal;
   comparing the metric to a threshold value;
   writing the digital representation of the acoustic signal to persistent storage in dependence on a result of comparing the metric to the threshold value; and subsequently transferring the digital representation of the acoustic signal from the ear-worn device to an external device.

21. The method of claim 20, wherein the transferring is via a transmission when a battery level is above a threshold value or when the ear-worn device is charging.

22. The method of claim 20, wherein the metric is a signal-to-noise ratio (SNR) of the acoustic signal.

23. The method of claim 20, wherein the method further comprises de-noising the acoustic signal using a neural network.

24. The method of claim 23, wherein calculating the metric of the acoustic signal comprises calculating the metric of the acoustic signal after de-noising the acoustic signal using the neural network.

25. The method of claim 24, wherein the metric represents a quality of the acoustic signal.

26. The method of claim 23, wherein the metric comprises a prediction of an error of an output of the neural network and/or a confidence level of the output of the neural network.

27. The method of claim 23, further comprising re-training the neural network using the digital representation of the acoustic signal written to persistent storage.

28. The method of claim 23, wherein the ear-worn device is a smartphone connected coupled to the ear-worn device via the Cloud.

\* \* \* \* \*